Aug. 16, 1960  K. GEBELE  2,949,072
PHOTOGRAPHIC SHUTTER WITH BUILT-IN SYNCHRONIZER
Filed April 16, 1957  5 Sheets-Sheet 1

INVENTOR
Kurt Gebele
By Charles Shepard
Attorney

INVENTOR
Kurt Gebele
By Charles Shepard
Attorney

Aug. 16, 1960 K. GEBELE 2,949,072
PHOTOGRAPHIC SHUTTER WITH BUILT-IN SYNCHRONIZER
Filed April 16, 1957 5 Sheets-Sheet 4

INVENTOR
Kurt Gebele
By Charles Shepard
Attorney

Aug. 16, 1960   K. GEBELE   2,949,072
PHOTOGRAPHIC SHUTTER WITH BUILT-IN SYNCHRONIZER
Filed April 16, 1957   5 Sheets-Sheet 5

INVENTOR
Kurt Gebele
By Charles Shepard
Attorney

United States Patent Office 2,949,072
Patented Aug. 16, 1960

2,949,072

PHOTOGRAPHIC SHUTTER WITH BUILT-IN SYNCHRONIZER

Kurt Gebele, Munich, Germany, assignor, by mesne assignments, to Compur-Werk Friedrich Deckel OHG, Munich, Germany, a German firm Filed Apr. 16, 1957, Ser. No. 653,228

Claims priority, application Germany Apr. 10, 1952

5 Claims. (Cl. 95—11.5)

This invention deals with a photogaphic shutter, particularly a shutter of the so-called objective type or lens type as distinguished from a shutter of the focal plane type. An object of the invention is the provision of generally improved and more satisfactory synchronizer mechanism, built into the shutter casing as an integral part of the shutter structure, for closing an electric switch to operate a flashlight in proper synchronism with the opening of the shutter blades.

In certain prior shutters, the main driving member or master member of the shutter is held in set or tensioned position by a spring loaded pawl, which pawl is moved to release position by the action of the flashlight synchronizer mechanism after the synchronizer mechanism begins to operate. In such shutters, the spring acting upon the main pawl must be relatively light or weak, in order not to make too great a resistance to the action of the synchronizer mechanism in seeking to unlock or release the main pawl, because the synchronizer mechanism itself is usually driven by a spring of rather small power. In such prior arrangements, the weakness of the spring which holds the main latching pawl in its latched position has the serious disadvantage that a strong vibration of the shutter, as for example during transportation of the camera on which the shutter is mounted, can sometimes cause an unintentional release of the main pawl and thus an unintentional and undesired exposure operation of the shutter.

It is, accordingly, another object of the present invention to overcome the drawbacks above noted, and to provide a synchronized shutter in which the main latching pawl may be manually released and hence may be spring loaded to a sufficient extent to withstand impacts and vibrations so as to be dependable in operation, and in which the synchronizer mechanism operates to release a second or supplementary pawl or latch which comes into play only after the main latching pawl is released and which, therefore, is for all practical purposes no longer subject to any external impact or vibration during transportation of the camera, because this second latch or pawl is in operation only for a very brief time during the actuation of the shutter. Hence the second latch or pawl can safely be loaded by a relatively light or weak spring, making it easy for this pawl to be operated by the synchronizer mechanism without requiring excessive power in the synchronizer mechanism.

A further object is the provision of synchronizer mechanism having the desirable characteristics above mentioned, and having provision for adjustment by the user to provide "X" synchronization for flashlights having no appreciable time lag, and for "M" synchronization for flashlights having a substantial time lag from the moment the electric switch is closed to the moment of maximum intensity of illumination.

A still further object is the provision of synchronizer mechanism having the very desirable characteristics above mentioned, and also being of such form that the synchronizer mechanism can be constructed and assembled relatively inexpensively and easily, and also designed so as to require only relatively moderate and inexpensive changes in the tooling used in manufacturing shutters of kinds already in production.

These and other desirable objects may be attained in the manner disclosed as an illustrative embodiment of the invention in the following description and in the accompanying drawings forming a part hereof, in which:

Fig. 5 is a fragmentary view showing details of the construction according to Figs. 1–4 but omitted from those figures for the sake of clarity;

The same reference numerals throughout the several views indicate the same parts.

Figure 1:
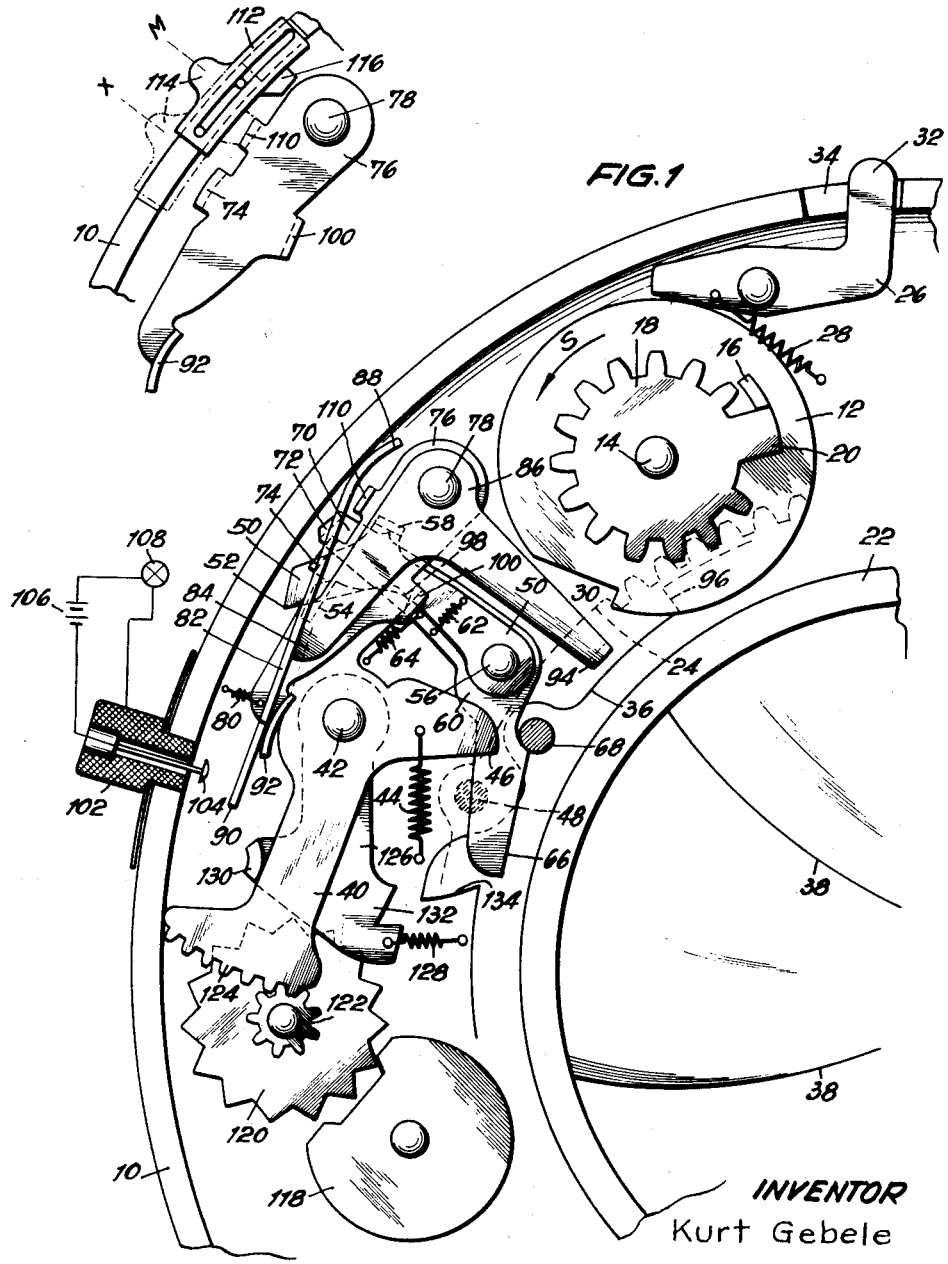
Fig. 1 is a front view of a fragment of a photographic shutter with the present invention applied thereto, the front cover plate and certain other parts of the shutter being removed in order better to show the parts beneath, and certain parts being illustrated schematically or diagrammatically, the parts being shown in their rest position.

Referring first to the embodiment shown in Figs. 1–5, the shutter mechanism is in the usual casing 10 intended to be attached in the front of the camera, the casing being of generally annular form, the casing having a central aperture normally closed by the shutter blades 38, and the mechanism for opening and closing these blades being mounted in the annular space between the outer peripheral wall of the casing and the inner wall or lens tube 22. The operating mechanism for opening and closing the shutter blades may be of any conventional or known form, and so it is not disclosed in detail in the present drawings, which are confined to the synchronizer mechanism and a few associated parts. Those skilled in the field of photographic shutters will readily recognize the relationship of the parts which are here illustrated, to the conventional parts which are not here shown.

The main driving member of the shutter, furnishing the motion for opening and closing the shutter blades, and often referred to as the master member of the shutter, is in this instance the rotary member 12 mounted to turn on the pin 14 and constantly under the influence of a main power spring or driving spring (not shown) which tends to turn the master member 12 in a clockwise direction. A projection 16 on the master member extends into the path of a lug 20 on the gear 18 which is freely rotatable on the pivot pin 14 of the master member, and which engages gear teeth on a shutter tensioning member 24 in the form of a ring rotatable on the lens barrel 22 and provided with a suitable projecting handle (not shown) which extends out through a slot in the shutter casing to an accessible external position so that, by means of this handle, the tensioning ring 24 may be turned clockwise to tension or set the shutter ready for operation. The tensioning ring 24 is arranged in a plane above the master member 12 and above some of the other parts which it is desired to illustrate, so for the sake of clarity the ring 24 is shown only in broken lines, in order not to interfere with illustrating parts beneath it.

Figure 2:
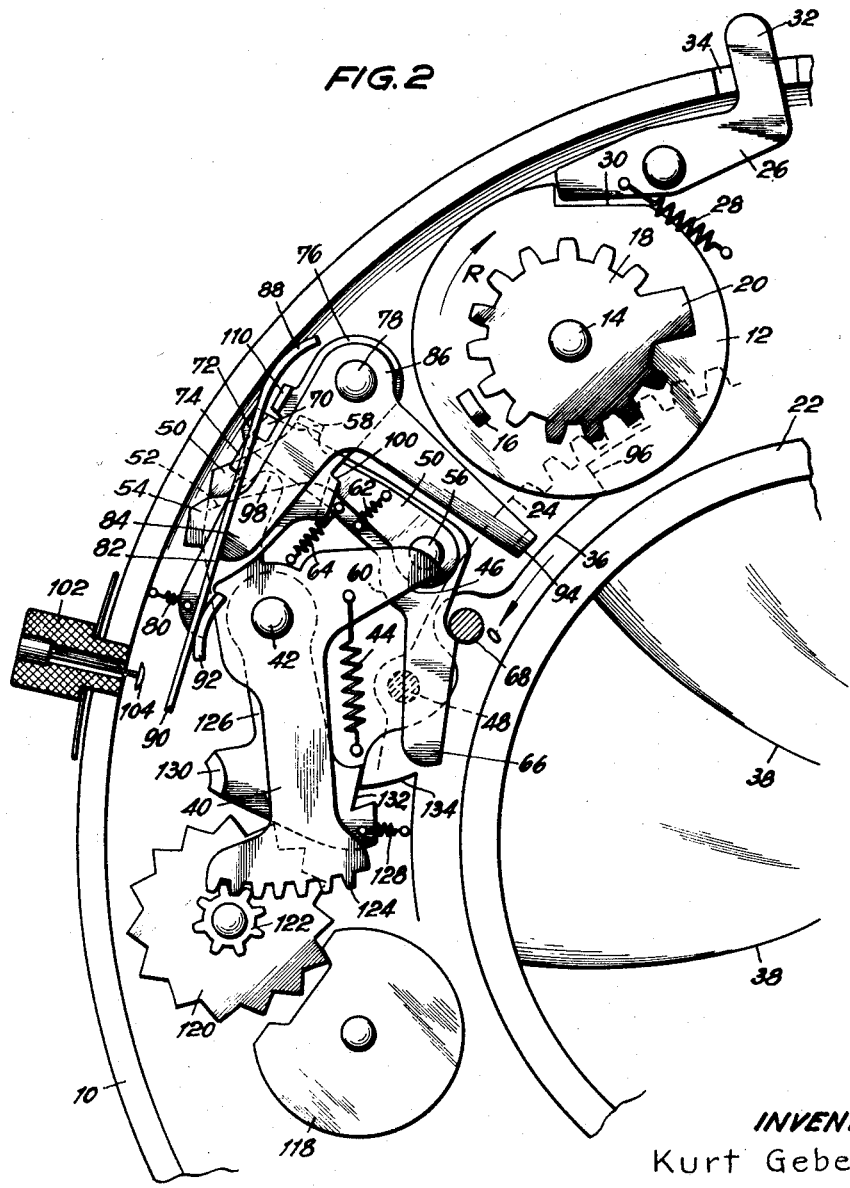
Fig. 2 is a similar view with the parts in set or tensioned position.

When the tensioning ring 24 is turned in a clockwise direction from the initial or rest position shown in Fig. 1, it causes counterclockwise turning of the gear 18, and the driving lug 20 thereon, engaging the lug 16 on the master member 12, causes corresponding counterclockwise turning of the master member in the setting direction indicated by the arrow S in Fig. 1, until at the end of the setting stroke a notch 30 on the master member comes opposite the tail of the latching pawl 26, which is pulled by a spring 28 into latching engagement with the notch, as shown in Fig. 2. The pressure on the setting handle of the setting ring 24 is now released, and the spring of the setting ring moves it back in a counterclockwise direction to its initial or rest position, the gear 18 turning back to its initial position at the same time, but leaving the master member 12 in its set or tensioned position, held by the latch pawl 26. This pawl has a release arm 32 which extends out through a slot 34 in the shutter casing to an accessible position where this arm 32 can be manipulated to operate the shutter to make an exposure. Since the latching pawl 26 is always released by finger pressure or other suitable external operating means, rather than by the synchronizer mechanism, it follows that the spring 28 can be made relatively strong, in order to hold the master member safely latched in its tensioned position notwithstanding any vibrations or impacts to which the camera and shutter may be subjected during transportation.

The usual blade ring 36 is mounted to turn on the lens tube 22, and is connected in the usual manner to the shutter blades 38, which may be of any desired number, about three to six blades usually being employed, depending upon the size of the shutter and other factors. The blade ring 36 is also connected by any conventional known mechanism (not shown) to the master member 12, in such fashion that when the master member 12 turns in a clockwise direction, it will drive the blade ring 36 first in a counterclockwise direction to open the shutter blades 38, and then in a clockwise direction to close the blades again. Thus, if the master member 12 has first been tensioned from the rest position shown in Fig. 1 to the set position shown in Fig. 2, the operation of the release arm or trigger 32 will remove the pawl 26 from the notch 30 of the master member and will allow the main driving spring or power spring of the shutter to turn the master member 12 in the clockwise direction indicated by the arrow R in Fig. 2, so that the master member in turn will drive the blade ring 36 and cause an opening movement and closing movement of the shutter blades.

The flashlight synchronizer mechanism, in accordance with the first embodiment of the present invention, comprises what may be called a synchronizer member 40 rotatable on a pin or shaft 42 fixed in the shutter casing, and under the action of a spring 44 constantly tending to turn the synchronizer member 40 in a clockwise direction on its pivot. A nose 46 on the synchronizer member 40 extends, when the synchronizer member is in its rest position, into the path of movement of a pin 48 on the tensioning member 24, so that whenever the tensioning member is turned in a clockwise direction to tension the shutter, the pin 48 will engage the nose 46 and thus move the synchronizer member 40 in a counterclockwise direction on its pivot 42, against the force of its spring 44, from the rest position shown in Fig. 1 to the tensioned position shown in Fig. 2. When the synchronizer member reaches this tensioned position, it is held in such position by a pawl 50 having a nose 52 which drops behind a hook or abutment 54 on the member 40, as seen in Fig. 2.

This synchronizer locking pawl 50 is mounted to turn on the pin 56 in the shutter housing 10. The pawl carries a downturned ear or lug 58 which overlaps one arm of a double-armed pawl 60 mounted to turn on the same pivot 56. A spring 62 connected to both pawls tends to hold the ear 58 of the first pawl constantly engaged with a portion of the pawl 60. Another spring 64 connected to the pawl 60 and to a fixed pin in the shutter casing, tends to swing the pawl 60 (and with it the pawl 50) in a counterclockwise direction on the pivot 56, thus also tending to hold the second arm 66 of the pawl 60 constantly against a pin 68 on the blade ring 36. The other arm of the pawl 60, indicated for convenience by the numeral 70, carries a locking hook or lug 72 which cooperates with a locking lug 74 of a switch operating lever or contact lever 76, the shape of which is best seen in Fig. 5. This lever 76 is mounted to turn on a fixed pivot 78 in the shutter casing, and is under the action of a spring 80 which constantly tends to swing the switch lever 76 in a clockwise direction on the pivot 78.

The movable member of the electric switch is in the form of a leaf spring 82 suitably fastened (for instance, soldered) approximately at its center to the arm 84 of a double-armed angular contact lever or bellcrank lever 86, mounted to turn on the same pivot 78 on which the switch operating lever 76 is mounted. One end 88 of the contact spring 82, that is, the end nearer to the pivot 78, is slightly bent and rests against the inner face of the outer annular metal wall of the shutter casing 10, making a sufficiently firm contact therewith to insure a good electrical connection at all times. The other end 90 of the switch contact member 82 presses resiliently against an upstanding lug 92 on the switch operating lever 76. The second arm of the bellcrank lever 86 has an ear 94 which extends into the path of movement of a shoulder 96 on the blade ring 36, in such position that just as the blade ring 36 closely approaches its extreme counterclockwise position, the shoulder 96 will engage the lug 94 and swing the bellcrank lever 86 in a clockwise direction on its pivot 78.

The synchronizer member 40 has a nose 98 which, in the rest position of the parts, presses against a lug 100 on the switch operating lever 76 and thus holds the latter in its counterclockwise position, against the force of its spring 80.

Mounted on the outer annular wall of the shutter casing 10 and projecting approximately radially outwardly therefrom, is the metal contact nipple 102 of conventional form, the nipple being in electrical conducting contact with the metal shutter casing, and, through the casing, with the end 88 of the spring contact member 82. These parts constitute one side of the electric circuit. The other side thereof includes the metal pin 104 extending through the nipple 102 but insulated therefrom, the inner end of the pin 104 constituting the stationary electric contact element. By any suitable conventional electric cord or cable, indicated diagrammatically in Fig. 1, the nipple 102 and pin 104 are electrically connected in the usual manner to the flashlight circuit, including a source of current such as the battery 106, and a flashlamp such as the bulb 108. The circuit is normally open between the fixed contact 104 and the movable contact 90, as indicated in Figs. 1 and 2, but if the movable contact 90 is moved into engagement with the fixed contact 104, as in Figs. 3 and 4, this closes the electric circuit and causes the flashbulb to light up.

The switch closing lever 76, which serves to close the switch when "M" synchronization is being used, but which does not come into play during "X" synchronization, is provided with a lug 110 (see Fig. 5) which lies opposite a slide 112 slidable in a circumferential or peripheral direction on the outer annular wall of the shutter casing, and provided with a protuberance 114 which serves for operating this slide by finger pressure and serves also as an indicator or index point used in conjunction with markings "M" and "X" suitably marked on the exterior of the shutter casing and indicated diagrammatically in Fig. 5. When the slide 112 is moved to the position where the projection 114 is opposite the "M" marking, which position is shown in full lines in Fig. 5, the slide is entirely out of the path of movement of the switch operating lever 76 and does not interfere with switch closing movements of this lever. If the slide 112 is moved leftwardly and downwardly from the "M" position to the position where the part 114 is opposite the "X" marking on the shutter casing, then a projection 116 on the slide 112 comes opposite the ear 110 on the lever 76, as shown in dotted lines in Fig. 5, and blocks the switch closing lever 76 so that this lever cannot swing in a clockwise direction and thus cannot cause closing of the electric switch.

The run-off motion or running down motion of the synchronizing member 40 is delayed by suitable escapement mechanism including the vibrating escapement pawl or anchor 118 having escapement teeth which cooperate with the teeth of an escapement wheel or star wheel 120 which carries a pinion gear 122 meshing with gear teeth 124 on the end of the synchronizer member 40. Thus when the synchronizer member 40, having first been set or tensioned, is released by removal of the pawl nose 52 from the hook 54 of the synchronizer member, the synchronizer member will turn in a clockwise direction on its pivot 42, but only at a delayed rate covering an appreciable time interval, as controlled by the escapement parts 118, 122.

Below the synchronizer member 40 and mounted on the same pivot 42 therewith, there is a latching lever 126 having an upstanding lug 130 arranged under certain conditions to contact with the left edge of the synchronizer member 40, and having a spring 128 which tends to turn the latching member in a counterclockwise direction on the pivot 42, thus tending to hold the lug 130 against the synchronizer member 40, so far as permitted by engagement of various other parts. A locking notch 132 on the latching lever 126 lies in a position to cooperate with the latching nose 134 on the blade ring 36. These parts 132 and 134 are in such position relative to each other that when the blade ring has just moved a very slight distance in a blade-opening or counterclockwise direction, but before the blades have actually begun to open, the nose 134 will engage in the notch 132 and stop further movement of the blade ring, if the notch 132 and latching lever 126 are at that time positioned so that the nose 134 can engage therewith.

The engagement of the end 88 of the contact spring 82 with the wall of the casing 10 occurs at such point, relative to the pivot 78, that the force of this contact spring 82 tends constantly to move this spring 82 and its bellcrank lever 86 with slight force in a counterclockwise direction on the pivot 78. However, this counterclockwise force exerted on the bellcrank lever 86 is less than and is easily overcome by the force of the spring 80, which tends to pull the switch operating lever 76 and the movable switch contact member 82 in a clockwise direction on the pivot 78, whenever the lever 76 is unlatched and allowed to move in this direction.

Using a flashbulb of the conventional kind, having a time lag of, for example 20 milliseconds from the time the electric circuit is closed to the time of maximum intensity of illumination, then the slide 112 (Fig. 5) is set in the "M" position shown in Fig. 5 in full lines, so that the part 116 does not block the motion of the switch closing lever 76. The nipple 102 is electrically connected in the usual manner, by cord or cable, to the flashbulb and the battery. The shutter mechanism is set or tensioned from the rest position of Fig. 1 to the set position of Fig. 2, by moving the tensioning ring 24 in a clockwise direction to turn the gear 18 and the master member 12 in a counterclockwise direction until the latching pawl 26 drops into the notch 30 of the master member. This same clockwise movement of the tensioning member 24 also causes the pin 48 thereon to engage the nose 46 of the synchronizer member 40 and swing this synchronizer member in a counterclockwise direction on its pivot 42, until the hook 54 of the synchronizing member is caught and held by the end 52 of the pawl 50. Upon release of the tensioning ring 24 at the conclusion of the tensioning movement, the tensioning ring returns idly in a counterclockwise direction to its initial rest position.

The tensioning movement of the synchronizer member 40 carries the lower part of this member to the right, thus pulling it away from the upstanding lug 130 on the latching member 126, so that the spring 128 of the latching member 126 can pull this latching member over to the proper position ready to catch the nose 134 on the blade ring as soon as the blade ring starts its movement. At this time, the shutter is held against operating movement by the main latching pawl 26, not by the synchronizer locking pawl 50, and thus the springs 62 and 64 acting on the synchronizer locking pawl 50 may be made relatively weak, as they do not have to guard against accidental operation by vibrations or impacts during carrying of the camera.

By the operator's finger pressure on the trigger 32, the main latching pawl 26 is released from the notch 30 of the master member 12, and the main power spring or driving spring of the shutter starts to turn the master member 12 in a clockwise direction as shown by the arrow R in Fig. 2, which motion of the master member in turn starts to turn the blade ring 36 in a counterclockwise direction on the lens tube 22. Almost immediately after the beginning of this movement of the blade ring, however, the nose 134 thereon engages in the notch 132 of the blade ring latching member 126, which temporarily stops further movement of the blade ring, before the blades have begun to open. But the slight movement of the blade ring which does take place, before it is latched by the lever 126, is nevertheless sufficient to cause the pin 68 on the blade ring to move the tail 66 of the double-armed lever 60. This movement of the lever 60 withdraws the latching nose 72 of this lever from the lug 74 of the switch operating lever 76, and allows the spring 80 immediately to move the switch operating lever 76 clockwise about its pivot 78, so that the lug 92 on the switch operating lever presses the end 90 of the movable switch contact 82 to the left, against the fixed switch contact 104, thus closing the switch.

When the electric switch is closed, the shutter blades 38 are still in their closed position, because the blade ring 36 is being held against further movement by the latching lever 126. However, the same clockwise movement of the lever 60 which has released the lever 76 for switch-closing movement, has served also to cause counterclockwise movement of the pawl 50, to withdraw the latching end 52 thereof from the latching hook 54 of the synchronizer member 40. So now, simultaneously with the closing of the electric switch 90, 104, the synchronizer member 40 has been released and its spring 44 is allowed to turn it in a clockwise direction on its pivot 42, as fast as permitted by the escapement mechanism 118, 124. After a short time interval, depending upon the construction of the escapement 118, 124 and upon the strength of the spring 44, the synchronizer member 40 moves far enough in a clockwise direction so that the left edge of this member engages the lug 130 on the latching lever 126 and causes leftward swinging movement of the latching lever, disengaging the latching notch 132 from the nose 134 on the blade ring 36. The blade ring is now free to continue its blade-opening movement in the direction of the arrow O in Fig. 2, under the influence of the main power spring driving the master member 12, and then when the blades have been fully opened, the blade ring then moves back in the opposite direction, closing the blades, in known manner. The synchronizer parts are so timed that an interval of substantially twenty milliseconds elapses from the time that the switch 90, 104 is closed to the time that the shutter blades reach their fully open position. But by suitable changes in the strength of the spring 44 and in the gear ratios of the gears 122, 124 and the weight of the escapement anchor 118, this time interval can, of course, be changed to accommodate the construction to flashbulbs that may become popular in the future, with time lags greater or less than twenty milliseconds, although bulbs having time lags of twenty milliseconds are most commonly used at present.

Figure 3:
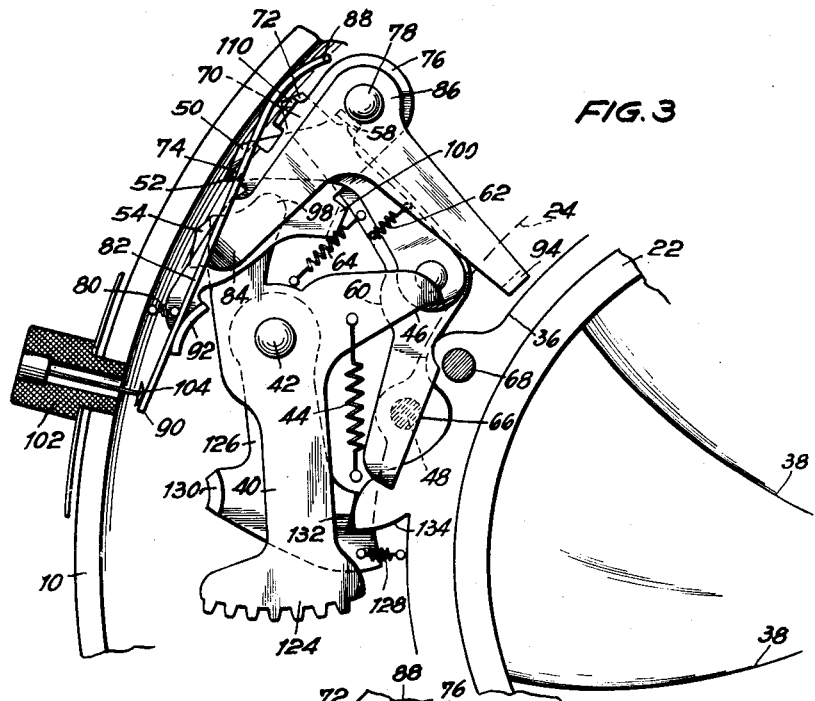
Fig. 3 is a similar view of some of the parts shown in Figs. 1 and 2, near the beginning of an "M" synchronization operation with the electric switch already closed and with the synchronizing mechanism in operation but the shutter blades not yet open.
Figure 4:
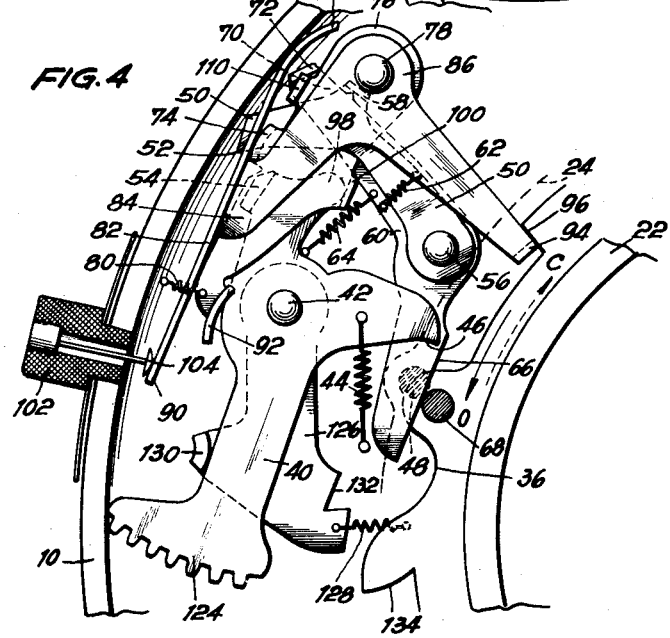
Fig. 4 is a view similar to Fig. 3 with the shutter blades fully open, this view illustrating also the switch-closing action of the parts during "X" synchronization.

At the completion of the switch closing movement and beginning of the running down movement of the synchronizer 40, the parts are substantially in the position shown in Fig. 3. At the completion of the entire exposure when the shutter blades have been opened and again closed, the parts are in the normal rest position or initial position shown in Fig. 1.

If the photographic exposure is to be made by the use of a flashlamp having no appreciable time lag, such as the flashlamps commonly known as "speed lamps," then the electric switch should not be closed slightly in advance of full opening of the shutter blades, but should be closed simultaneously with full opening of the shutter blades. In this event, the slide 112 (Fig. 5) is moved from "M" position to "X" position, in which the part 116 of the slide lies opposite the part 110 of the switch operating lever 76 and prevents this lever from moving to switch-closing position. So when the trigger 32 is released and the master member 12 begins to turn, the blade ring 36 begins to turn just as before, and is caught and stopped by the latching lever 126 just as before, and the pin 68 on the blade ring serves to turn the levers or pawls 60 and 50, just as before. But although the part 72 of the pawl 60 releases the switch operating lever 76, the latter still cannot move on account of being blocked by the part 116 of the slide 112. So the switch is not closed at this time. However, the movement of the pawl 50 releases the synchronizer member 40, just as in the case of "M" synchronization, and the synchronizer member runs down under the influence of its spring 44, until it finally pulls the notch 132 away from the nose 134 and permits the blade ring 36 to continue its interrupted movement in a clockwise direction, to open the shutter blades.

Just before the conclusion of the opening movement of the blade ring 36, the abutment 96 thereon engages the end 94 of the switch lever 86, and swings the entire switch lever in a clockwise direction on its pivot 78, thereby moving the movable switch contact 90 into engagement with the fixed contact 104, to close the switch, independently of the switch lever 76. This closing of the electric switch occurs at the completion of the counterclockwise movement or opening movement of the blade ring in the direction of the arrow O in Figs. 2 and 4, simultaneously with the blades 38 themselves reaching fully opened position. Thus, when using the "speed lamp" type of illumination, the maximum intensity of flash occurs while the blades are fully open. The blade ring 36 then moves back in a closing direction, in the direction of the arrow C of Fig. 4, and the parts are restored to the initial or rest position of Fig. 1.

Figure 6:
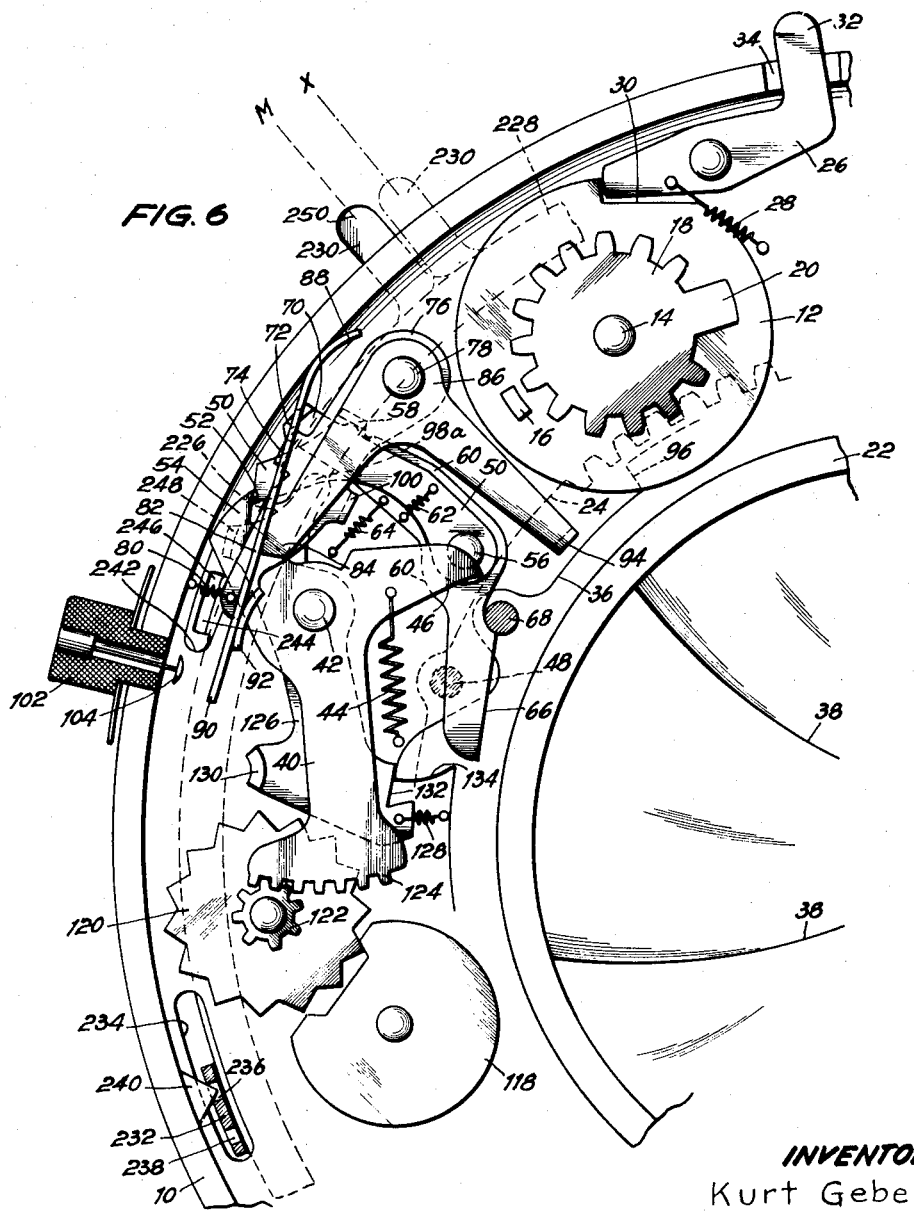
Fig. 6 is a view similar to Fig. 1, showing a second embodiment of the invention, with the parts set or tensioned ready for "M" synchronization.
Figure 7:
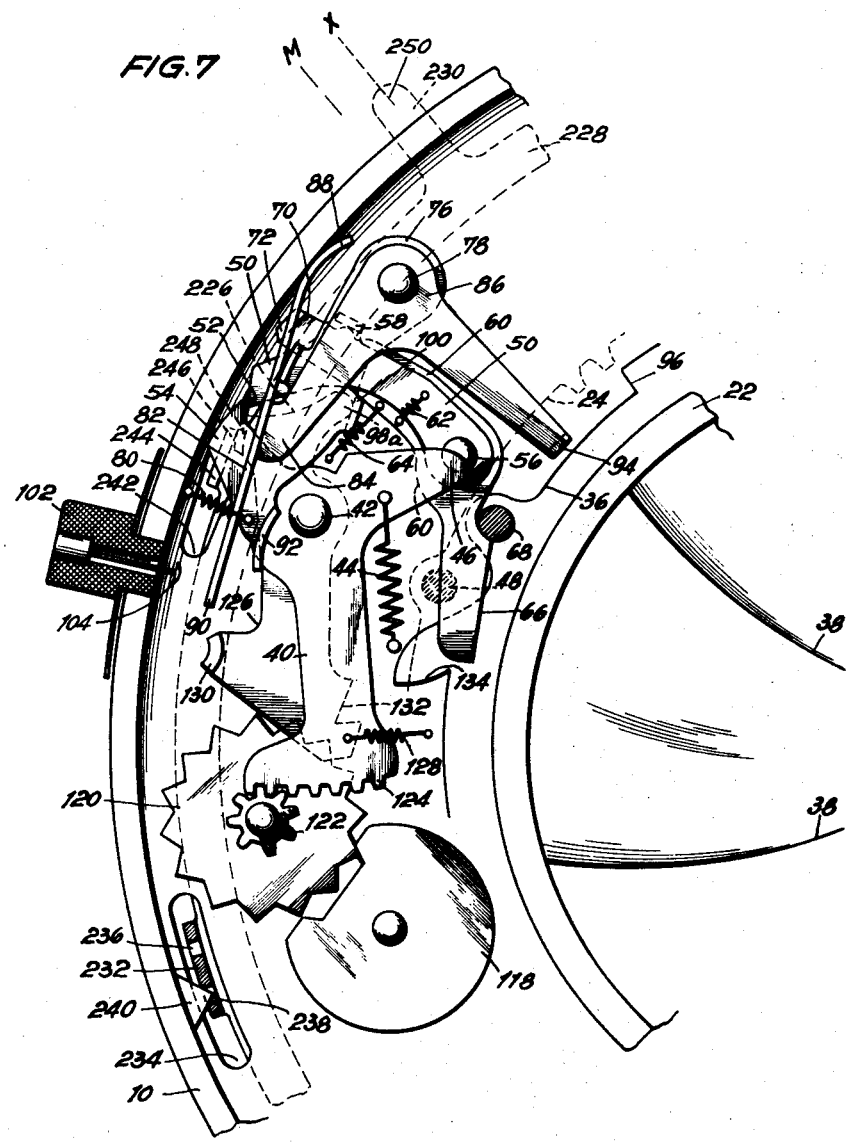
Fig. 7 is a view of the embodiment shown in Fig. 6, with the parts in set or tensioned position ready for "X" synchronization.

A modification of the construction, according to another embodiment of the invention, is illustrated in Figs. 6 and 7. Except in the respects mentioned below, this construction is the same as the first embodiment, and the corresponding parts in the second embodiment are indicated by the same reference numerals as in the first embodiment, so that no further description of the second embodiment is needed, except with respect to the differences.

In this second embodiment, the synchronizer member 40 no longer carries the nose 98 to cooperate with the part 100 of the switch operating lever 76, to hold this lever in its ineffective position when the parts are in their run-down or rest position. Instead, a nose 98a, having this same function as the nose 98 in the previous embodiment, is formed at the end of an extension or arm 226 on the latching lever 126. Also, in this second embodiment, the adjustment member adjustable between positions "M" and "X" no longer cooperates directly with the switch operating lever 76 to hold it against actuation when the parts are set for "X" synchronization, but instead, the "X" adjustment part now cooperates directly with the latching pawl 126, and holds this pawl in an ineffective position and, through the action of the nose 98a on this pawl, holds the switch operating lever 76 in an ineffective position.

To this end, the switch adjusting member or control member is in the form of a ring 228 movable in a circumferential direction on the rear side of the casing 10, and provided with an accessible finger piece 230 by which it may be moved. A resilient lug 232 is bent up from the switch control ring 228 and extends forwardly through a slot 234 in the rear wall of the shutter casing, into the inside of the shutter. This lug 232 has two openings 236 and 238 arranged for selective cooperation with a detent projection 240 fastened to the wall of the shutter casing. Thus the detent 240, engaging in one or the other of the holes 236 and 238 in the resilient lug 232, will tend to hold the switch control ring 228 resiliently in either one of the two positions in which it may be set.

There is another slot 242 in the rear wall of the shutter casing, through which extends a second lug or ear 244 bent up from the switch control ring 228 and extending into the inside of the shutter casing. This lug 244 has an oblique surface 246 which cooperates with and has a camming action against a lug or ear 248 on the arm 226 of the latching lever or pawl 126.

When taking pictures with an ordinary flashbulb having the usual time lag between switch closing and maximum intensity of illumination, the switch control ring 228 is moved so that the index mark 250 on the operating handle 230 is opposite the "M" mark which is placed on the casing and which is indicated diagrammatically in Fig. 6. The parts assume the position shown in Fig. 6, when the shutter is set or tensioned. The opening 236 of the resilient lug 232 is seated on the detent projection 240. The ear 244 is out of the path of the lug 248 of the latching lever 126, and does not in any way affect the operation of the latching lever. Thus the latching lever, under the influence of its spring 128, assumes the position shown in Fig. 6 (when the shutter is set or tensioned) and its nose 98a is spaced from the lug 100 of the switch operating lever 76, so that this switch operating lever can be moved by its spring 80 in advance of the opening of the shutter blades, just as in the first embodiment of the invention. The blade opening movement of the blade ring 36 is temporarily stopped by engagement of the parts 132, 134, until the synchronizer member 40 runs down, just as in the first embodiment.

In case this second embodiment of the invention is to be used with "speed lamp" synchronization or "X" synchronization, then the switch control ring 228 is moved in a clockwise direction, by the handle 230, until the index mark 250 is opposite the "X" marking on the shutter casing, this position of the parts being shown in Fig. 7. The opening 238 of the lug 232 is now seated on the detent 240. The lug 244 has now moved in a clockwise direction, or upwardly when viewed as in Figs. 6 and 7, so that the inclined cam edge 246 thereof engages the lug 248 of the latching lever 126 and moves the latter clockwise on its pivot 42, to the position shown in Fig. 7, in which the latching notch 132 is withdrawn entirely from the range of movement of the nose 134 on the blade ring 36. This clockwise swinging of the latching lever 126 also causes the nose 98a thereof to press against the lug 100 on the switch operating lever 76, holding this lever against a contact-making motion.

Consequently, the shutter having been tensioned, the subsequent release of the shutter operates the synchronizer parts to close the switch at the instant of full opening of the blades, by means of a shoulder 96 on the blade ring engaging the end 94 of the switch lever 84, just as in the previous embodiment. But because the latching lever 126 is entirely withdrawn from the path of movement of the part 134, the blade ring 36 is able to make its blade-opening movement in a single smooth and continuous movement, without having to pause temporarily while the synchronizer runs down.

This second embodiment of the invention is equally effective with the first embodiment, and has the further advantage as compared with the first embodiment, that when set for "X" synchronization, there is no momentary pause in the blade-opening movement of the blade ring; and also the further advantage that the switch control ring or adjusting ring 228 can be made to perform additional functions in addition to controlling the character of synchronization. For instance, it may be mounted for further movement in a clockwise direction, beyond the "X" position, and may be arranged so that this further clockwise movement tensions a preliminary escapement mechanism of known form, arranged in the shutter housing to delay the beginning of the exposure by several seconds, after the shutter is tripped, so that the photographer has time to take a position in front of the camera before the exposure is made. Such mechanisms are, in themselves, well known.

As already indicated, the shutter blades 38 are connected in the usual manner to the blade ring 36. This connection is a direct pivotal connection between the blade ring and the shutter blades, conventional pivotal connections of this kind being well known as shown, for example, in the expired patent to Deckel and Geiger, No. 1,687,123 (where the blades 12 are pivotally connected at 16 to the blade ring 14) and in the expired patent to Pirwitz, No. 2,165,574 (where the blades 15 are pivotally connected at 19 to the blade ring 20).

The present shutter is particularly satisfactory from the standpoint of accuracy and reliability of timing, even after long continued use, because of the combination, in the shutter structure, of the various features above described. To recapitulate, some important features conducive to the good results are the following: (1) the latch for holding the shutter blades closed while the clockwork timing mechanism or gear mechanism is running down, latches directly against the blade ring, rather than against a part which is operationally more remote from the blades; (2) the electric switch closing movement is controlled from movement of the blade ring, rather than from movement of some other part more remote (in an operational sense) from the shutter blades; (3) the electric switch is closed independently of movement of the clockwork timing mechanism or gear mechanism, at all settings of the synchronizer mechanism, whether M or X; and (4) the clockwork timing mechanism or gear mechanism can begin to run down to an appreciable extent, and thus can overcome its initial inertia and starting resistance, before the timing or gear mechanism encounters the frictional resistance of moving the blade ring latch from latched position to ineffective or unlatching position.

With reference to this last mentioned feature, it is pointed out that the power required to start a clockwork or gear train from a stationary position to a running condition is greater than the power required to keep it running, because of the effect of inertia as well as the fact that, for given conditions of pressure, static friction is greater than kinetic or dynamic friction. If the clockwork timing mechanism or gear mechanism must immediately encounter and overcome the frictional resistance to unlatching movement of the latch, at the same time that it overcomes the static friction and inertia of the clockwork timing mechanism itself, a relatively powerful driving spring will be needed for the timing mechanism. But a less powerful spring is sufficient in the present construction, because the arm 40 of the clockwork timing mechanism or gear mechanism does not engage the ear 130 on the latching lever 126 until after the clockwork timing or gear mechanism has already overcome its initial starting resistance and has gotten up to normal running speed, with consequent lessening of the power required to keep it running, so that the less powerful spring furnishes sufficient power to keep the gears running and also to overcome the resistance of withdrawing the latching lever 126 from the latching nose 134, being assisted in so doing by kinetic inertia or momentum of the gearing already running at normal speed.

The importance of the combination of these features above reviewed can be better evaluated when it is realized that a photographic shutter of the synchronized type must operate with great accuracy in a timed sequence measured in milliseconds, that is, in thousandths of a second. Features which might be relatively unimportant in a slower moving mechanism become quite important at the high speeds and accurate timing necessary in a modern photographic shutter. It is the opening and closing of the shutter blades themselves which constitute the reference point to which all other operations of the shutter mechanism must be accurately related. Therefore, more accurate and reliable results can be obtained when, as in the present invention, the operations of various parts control or are controlled by the movements of the blade ring itself, which is functionally the closest operating part to the shutter blades, being connected directly to them. When certain operations control or are controlled by movements of some other part more remote (in an operational sense) from the shutter blades, such as the so-called master member, errors in accuracy of timing or operation are likely to be introduced either as a result of initial manufacturing in accuracies or tolerances, or as a result of wear of the parts of the shutter in use. Especially after a shutter has been in use for some time, it is quite possible that there may be some looseness or play between the blade ring on the one hand, and other parts (such as the master member) which are operationally more remote from the shutter blades, on the other hand, and it will be appreciated that if latches or other parts act upon or are controlled by the master member, there is a greater chance of inaccuracy in the very fine and delicate timing of the shutter operation, than is the case when the latches or other control parts act upon and are controlled by the blade ring itself, as in the present construction. Because of the combination of all of the above features listed in the recapitulation, the possible errors resulting from initial looseness or subsequent wear are eliminated or reduced to a minimum, in the present shutter, as compared with prior shutters which have included some of the listed features but have not utilized all of them in combination.

The present application is a continuation in part of my copending application for patent entitled Photographic Shutter with Built-in Synchronizer, Serial No. 297,901, filed July 9, 1952, now abandoned.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter comprising a casing having an exposure aperture, a plurality of blades movably mounted in said casing for opening and closing said aperture, a blade ring rotatable in said casing and pivotally connected to said blades to move them first to open position and then to closed position, a master member operatively connected to said blade ring and tending to move said blade ring from blade closed position toward blade open position, a first latch for latching said master member in cocked position, release of said first latch enabling said master member to move said blade ring from blade closed toward blade open position, a second latch for latching said blade ring against further movement after a short initial movement insufficient to open said blades, an electric switch closing member spring biased toward switch closing position, a third latch for holding said closing member in switch open position, flashlamp synchronizer means including a pivoted lever spring urged for swinging movement in one direction from a tensioned position to a run down position and clockwork escapement mechanism operatively connected to said lever to control the rate of its swinging movement, a fourth latch for latching said lever of said synchronizer means in its tensioned position, means operated by said short initial movement of said blade ring for unlatching said third and fourth latches so that said switch closing member may move toward switch closing position and so that said lever of said synchronizer means may move from tensioned to run down position, and cooperating parts on said lever and said second latch for engaging each other only after said lever has moved from its tensioned position toward its run down position and before said lever reaches its run down position to release said second latch so that said blade ring may resume its movement to open the shutter blades, said synchronizer lever being free of said second latch during the major part of its swinging movement toward said run down position so that frictional resistance to unlatching movement of said second latch will not affect the running down of said synchronizer lever during the initial part of its movement, said second latch including a latch lever pivoted on the same pivot as said synchronizer lever to swing concentrically therewith so that when said synchronizer lever engages said latch lever during the latter part of running down movement of said synchronizer lever, it will produce direct circumferential thrust thereon without sliding friction.

2. A photographic shutter comprising a casing having an exposure aperture, a plurality of blades movably mounted in said casing for opening and closing said aperture, a blade ring rotatable in said casing and pivotally connected to said blades to move them first to open position and then to closed position, a master member operatively connected to said blade ring and movable from a cocked position to a run down position to move said blade ring from blade closed position toward blade open position, a manually releasable first latch for latching said master member in cocked position, release of said first latch enabling said master member to move said blade ring from blade closed toward blade open position, a second latch for latching said blade ring against further movement after a short initial movement insufficient to open said blades, an electric switch member and a switch closing member mounted for concentric movement on a single pivot, said switch member being spring biased toward switch open position and said switch closing member being spring biased toward switch closing position by a stronger spring sufficient to overcome the bias of said switch member, a third latch for holding said switch closing member in switch open position against the force of its spring bias, cooperating contact surfaces on said blade ring and said third latch for unlatching said third latch by said short initial movement of said blade ring, so that said switch closing member may move said switch member to closed position, cooperating means on said blade ring and said switch closing member for restoring said switch closing member to switch open position to be latched therein by said third latch, when said blade ring moves from blade open to blade closed position, a synchronizer lever spring biased for running down movement from a tensioned position to a run down position, escapement clockwork mechanism for controlling the rate of running down movement of said lever, a fourth latch for holding said lever in tensioned position, means for unlatching said fourth latch concomitantly with the unlatching of said third latch by said short initial movement of said blade ring, and cooperating parts on said synchronizer lever and said second latch for engaging each other after said lever begins to move and before said lever reaches its run down position to release said second latch so that said blade ring may resume its movement to open the shutter blades, said lever exerting no latch-releasing pressure on said second latch during the major part of the running down movement of said lever, so that frictional resistance to release of said second latch will not affect the rate of travel of said lever during the major part of its movement, said synchronizer lever and said second latch being mounted for concentric swinging movement on a single pivot, and said third latch and fourth latch being mounted for concentric swinging movement on another single pivot, for the sake of compactness and for reduction of friction.

3. A photographic shutter comprising a stationary housing part, blades movable between closed and open positions, a blade ring mounted for oscillating movement relative to said housing part and operatively connected directly to said blades to open and close them, said blade ring being movable from an initial position in which said blades are closed to an intermediate position in which said blades are still closed and thence to a blade-open position, driving means for urging said ring from said initial position toward said blade-open position, a latching projection on said blade ring, a latch pivot mounted in stationary position relative to said housing part and spaced from said latching projection in a circumferential direction opposite to the direction of movement of said blade ring when moving from intermediate position toward blade-open position, a blade ring latching lever pivotally mounted on said pivot and extending from said pivot in the general direction of movement of said blade ring when moving from intermediate position toward blade-open position, said latching lever having a nose for engaging said latching projection on said blade ring to hold said blade ring in its said intermediate position to prevent further movement thereof toward blade-open position notwithstanding the urging of said driving means, clockwork timing mechanism urged for movement from a tensioned position toward a run-down position, pivoted latch means for holding said clockwork timing mechanism in its tensioned position, electric flashlight switch mechanism including a switch closing member mounted for movement independently of said clockwork timing mechanism, means controlled by movement of said blade ring from its initial position to its said intermediate position for moving said switch closing member to close said electric switch and for moving said pivoted latch means of said clockwork timing mechanism to an ineffective position so that said clockwork timing mechanism may begin to run down from its tensioned position toward its run-down position, and a part movable with said clockwork timing mechanism for engaging said blade ring latching lever after said timing mechanism has moved an appreciable distance during its running down movement, so that said clockwork timing mechanism may move sufficiently to overcome its initial starting resistance before being subjected to the resistance of moving said blade ring latching lever, further movement of said clockwork timing mechanism following such engagement serving to swing said blade ring latching lever to withdraw the nose thereof from said latching projection on said blade ring, so that said blade ring may complete its movement from its said intermediate position to blade-open position.

4. A photographic shutter comprising blades movable between closed and open positions, a blade ring mounted for oscillating movement and operatively connected to said blades to open and close them, said blade ring being movable from an initial position in which said blades are closed to an intermediate position in which said blades are still closed and thence to a blade-open position, driving means for urging said ring from said initial position toward said blade-open position, a movable latch member engageable directly with a part on said blade ring for latching said blade ring in said intermediate position to prevent further movement thereof toward blade-open position notwithstanding the urging of said driving means, clockwork timing mechanism urged for movement from an initial tensioned position toward a run-down position, means for holding said clockwork timing mechanism in its initial tensioned position, electric flashlight switch mechanism including a switch closing member mounted for movement independently of said clockwork timing mechanism, means controlled by movement of said blade ring from its initial position to its said intermediate position for moving said switch closing member to close said electric switch and for releasing said clockwork timing mechanism so that it may begin to run down from its initial tensioned position toward its run-down position, and a part movable with said clockwork timing mechanism for engaging said latch member after said timing mechanism commences its running down movement, further movement of said timing mechanism following such engagement serving to release said latch member from said part on said blade ring so that said blade ring may complete its movement from its said intermediate position to blade-open position, said part movable with said clockwork timing mechanism being initially spaced from said latch member by a sufficient distance of idle movement so that said clockwork timing mechanism may overcome initial starting resistance and acquire normal running-down speed before engaging said latch member to move the same.

5. A photographic shutter comprising a housing having an exposure aperture, a plurality of shutter blades pivotally mounted in said housing for swinging movement from a closed position covering said aperture to an open position with respect to said aperture, a rotatable blade ring mounted for oscillation around said aperture and pivotally connected to said blades to swing said blades toward open position when said ring rotates in one direction and to swing said blades toward closed position when said ring rotates in the opposite direction, driving means movable between a rest position and a tensioned position and operatively connected to said blade ring to tend to move said blade ring first in a blade opening direction and then in a blade closing direction while said driving means moves from tensioned position toward rest position, a latch for engaging directly with a part on said blade ring to stop further movement of said blade ring in blade opening direction after a short initial movement in such direction insufficient to open said blades, an electric flash switch in said housing, a synchronizer adjusting member shiftable between an M position providing for switch closing in advance of full blade opening and an X position providing for switch closing simultaneously with full blade opening, spring driven gear mechanism movable between a rest position and a tensioned position and effective during movement from tensioned position toward rest position while said adjusting member is in M position to move said latch to an ineffective position to unlatch said blade ring so that said blade ring may continue its movement in blade opening direction, said gear mechanism moving said latch only after said gear mechanism moves from tensioned position toward rest position to an appreciable extent sufficient to overcome initial starting resistance in said gear mechanism, means controlled by said initial movement of said blade ring for initiating movement of said gear mechanism from tensioned position toward rest position, other means controlled by movement of said blade ring and independent of said gear mechanism for closing said electric switch during said short initial movement of said blade ring when said adjusting member is in said M position and for closing said electric switch substantially upon completion of blade opening movement of said blade ring when said adjusting member is in said X position, and a tensioning member effective upon movement in one direction to move both said driving means and said gear mechanism from their respective rest positions to their respective tensioned positions both when said adjusting member is in M position and when it is in X position.

References Cited in the file of this patent
UNITED STATES PATENTS

| | | |
|---|---|---|
| 2,331,568 | Pirwitz | Oct. 12, 1943 |
| 2,404,526 | Pirwitz | July 23, 1946 |
| 2,663,233 | Rentschler | Dec. 22, 1953 |
| 2,710,568 | Braun | June 14, 1955 |
| 2,727,445 | Rentschler | Dec. 20, 1955 |